United States Patent Office 3,488,400
Patented Jan. 6, 1970

3,488,400
HYDROGENATION PROCESS
John Paton Candlin, Robert William Dunning, Ronald Stanley McKenna, and Alan Roger Oldham, Runcorn, England, assignors to Imperial Chemical Industries Limited, London, England, a corporation of Great Britain
No Drawing. Filed Aug. 21, 1967, Ser. No. 661,809
Claims priority, application Great Britain, Aug. 24, 1966, 37,984/66
Int. Cl. C07c 5/06, 5/02, 5/14
U.S. Cl. 260—677          12 Claims

ABSTRACT OF THE DISCLOSURE

A process for the selective homogeneous hydrogenation of an organic substrate containing two or more sites of unsaturation which comprises contacting the substrate with hydrogen in the presence of a solution containing as a catalyst a soluble, divalent ruthenium compound, and arresting the reaction when the substrate has reached the required degree of hydrogenation.

---

This invention relates to the hydrogenation of unsaturated organic compounds and especially to a process for the selective hydrogenation of a substrate containing two or more sites of unsaturation.

Many compounds of ruthenium have been described in the literature, some of which have been proposed as catalysts for the homogeneous hydrogenation of organic compounds. We have now found that certain ruthenium compounds exhibit an unexpected selectivity when used as catalysts in the hydrogenation of acetylenic or olefinic bonds in organic substrates containing two or more sites of unsaturation.

According to the invention, a process for the selective homogeneous hydrogenation of an organic substrate containing two or more sites of unsaturation, as hereinafter defined, comprises contacting the substrate with hydrogen in the presence of a solution containing, as catalyst, a soluble divalent ruthenium compound, and arresting the reaction when the substrate has reached the required degree of hydrogenation. By "soluble" we mean soluble in the liquid medium in which the hydrogenation is carried out.

By the term "site of unsaturation" we mean any site in an organic compound, which is capable of absorbing one molecule of hydrogen. For example, an acetylenic triple bond could provide two such sites, the one being capable of absorbing a molecule of hydrogen to form an ethylenic double bond which in turn could absorb a second molecule of hydrogen to become fully saturated. Similarly, an ethylenic bond would provide only one such site.

Thus two or more sites may be present in a single compound, either in a single acetylenic bond, as in octyne-1, or in two or more bonds at different positions in the same compound, as in vinyl cyclohexene. Alternatively, the sites may be present in a mixture of two or more compounds, such as phenyl acetylene and hexene-1, or octyne-1 and octene-1.

Several previously proposed catalyst systems exhibit some difference in the rates with which they catalyse the hydrogenation of different individual unsaturated substrates; but the ratios of the appropriate reaction rates have only given rise to moderate selectivity, whereas with some catalysts acocrding to the present invention ratios of reaction rates as great as 50 to 1 have been obtained using mixed substrates. This enables one or more of the sites of unsaturation of a substrate containing two or more such sites to be saturated in preference to the other or others, provided that the hydrogenation is arrested at a suitable stage. In some instances, as much as 98% of one unsaturated site may be hydrogenated before the other sites begin to react. It will be appreciated however, that should the reaction be allowed to proceed unchecked, in most cases all the sites of unsaturation present would eventually become saturated so that the effect of the selectivity of the catalyst system would then be lost.

It is important to note that the differential rate with which our catalysts will promote the hydrogenation of different unsaturated species is not always in accordance with the rates with which they will promote the hydrogenation of the individual species. For example, when present singly, octene-1 is hydrogenated more rapidly than hexyne-1; but when a mixture of these two compounds is hydrogenated using a catalyst system according to our invention the hexyne is almost completely converted to hexene before there is any sensible reduction of the octene or hexene.

The selective hydrogenations which may be accomplished using our process fall within certain general classes which include:

(i) Hydrogenation of terminal acetylenic bonds in preference to terminal olefinic bonds, e.g. hexyne-1 in preference to octene-1. When a mixture of two such compounds is hydrogenated using our catalysts substantially all the alkyne is converted to alkene before the alkene originally present begins to react. If the hydrogenation were continued beyond this stage, the alkenes would be converted to alkanes or, alternatively, be isomerised depending on the prevailing reaction conditions.

(ii) Hydrogenation of terminal olefinic bonds in preference to cyclic olefinic bonds, e.g. hexene-1 is hydrogenated in preference to cyclohexene, and vinyl cyclohexene is selectively hydrogenated to ethyl cyclohexene.

(iii) Hydrogenation of terminal olefinic bonds in preference to internal, non-cyclic olefinic bonds, e.g. pentene-1 in preference to pentene-2.

(iv) Hydrogenation of conjugated dienes in preference to straight chain and cyclic olefines. e.g. cis- and trans-pentadienes in the presence of cyclopentene, were converted to a mixture of pentenes 1 and 2, without significant reduction of the pentenes or cyclopentene.

In general, the selective hydrogenation of two or more different unsaturated bonds in a given substrate will proceed according to the following probability scale: terminal acetylenic bonds/conjugated dienes/terminal olefins/cyclic olefins/internal non-cyclic olefins. Exceptions may occur with certain compounds due to steric or inductive effects.

The stage of the hydrogenation at which the process should be arrested may be readily determined by experiment. For example, a mixed substrate may be hydrogenated under carefully controlled conditions using the process of our invention and the product analysed at regular intervals. The results of these analyses may then be plotted on a graph from which it may be readily deduced at what stage the maximum concentration of the required product will be present in the mixture. The product mixture may be analysed by any convenient technique; but gas/liquid chromatography methods are preferred.

Once the pattern of the selective hydrogenation of a particular mixed substrate with a particular catalyst system has been established, the progress of subsequent hydrogenations may be monitored by a variety of methods, e.g. by measuring hydrogen uptake by volume or pressure drop, by timing the hydrogenation under standard conditions and/or by G.L.C. measurements of the product once the approximate stage of the hydrogenation has been reached.

Any divalent ruthenium compound may be used, provided that it is soluble in the liquid medium used for the hydrogenation. Preferably the ruthenium compound is one which contains displaceable ligands. However, it is frequently necessary to use a solvating agent to convert the ruthenium compound to a soluble form. The solvating agent usually comprises a polar solvent containing an active hydrogen atom. Preferably the active hydrogen atom is present in a hydroxyl group, suitable solvating agents including mono- and polyhydric aliphatic, aromatic and cycloaliphatic alcohols, phenols and water.

It is not essential that the whole of the ruthenium compound should be in solution at the outset of the hydrogenation, provided that sufficient is in solution to initiate the reaction. It is thought, without limiting the invention thereby, that the solvating agent functions by promoting conversion of the ruthenium compound catalyst to a hydrido-species which is soluble in the liquid medium used. Preferably the ruthenium compound is a complex containing at least one neutral ligand containing a donor atom of Group V-B or VI-B and at least one anionic ligand. The neutral ligand is preferably an organic substituted phosphine or arsine, such as $PR_3$ or $AsR_3$, where the symbols R represent hydrocarbyl radicals which may be the same or different, e.g. alkyl, aryl, alkaryl, aralkyl or cycloalkyl. When two neutral ligands are present, they may be replaced by a neutral bidentate ligand, such as $R_2P-Y-PR_2$ where R has the same significance as before and Y is a direct linkage or a divalent radical such as $-CH_2-$ or $-(CH_2)_n-$. Suitable anionic ligands include $Cl^-$, $Br^-$, $CN^-$, $NCO^-$, $CH_3COO^-$. Halogens are preferred anionic ligands.

Ruthenium compounds in which the ruthenium has a valency higher than 2 do not function as catalysts in our process but they may be readily reduced to the divalent state. This may be accomplished by any convenient method; for example by electrolysis, by reaction with zinc amalgam or by reacting the ruthenium compound with a metal hydride. Suitable metal hydrides are the simple hydrides of the metals of Group I-A or II-A or of an element of Group III-B of the Periodic Table of the Elements or complex hydrides containing more than one such metal or element. Preferred hydrides are those of the general formula $M^IM^{III}H_4$, wherein $M^I$ is a Group I-A metal and $M^{III}$ is a group III-B element. In particular, $M^I$ is selected from lithium, sodium and potassium and $M^{III}$ is either boron or aluminum. The hydride reduction is preferred, since some ruthenium complexes, although reduced to the divalent state and converted to soluble form by the solvating agent may still be comparatively inactive in our process unless they have been reduced by the hydride process. In some instances the activity of divalent, soluble ruthenium compounds may be enhanced by reaction with a hydride such as lithium aluminum hydride.

Hydride reduction may be effected by dissolving or suspending the ruthenium compound in a solvent such as an ether, especially diethyl ether or tetrahydrofuran. The hydride is then added as a solution, if possible in diethyl ether, or tetrahydrofuran, or otherwise as a slurry or suspension, to the solution or suspension of the ruthenium complex, until effervescence ceases. Particularly suitable hydrides are $LiAlH_4$, $NaBH_4$, $LiBH_4$ and $NaH$. Refluxing the mixture may be necessary for complete reaction. Excess hydride may be decomposed by adding, dropwise, a reagent which is capable of decomposing it but which will not interfere with subsequent reactions. Water and the lower alcohols are convenient reagents for this purpose but they should be deoxygenated before addition. The reagent is added until effervescence ceases. Should decomposition of the excess hydride produce an insoluble precipitate, this may be separated by decantation, centrifugation or filtration before the catalyst solution is used.

Ruthenium compounds which function as active hydrogenation catalysts in our process after reaction with hydrides include $RuCl_3(OH_2)_3$, $RuCl_3(SEt_2)_3$, $RuCl_2(PPh_3)_3$, $RuCl_2(AsEt_3)_3$, a red polymer believed to have the formula $[RuCl_2PPh_2CH_2CH_2PPh_2]_n$ formed from $RuCl_2(PPh_2CH_2CH_2PPh_2)_2$ by reduction with zinc dust in naphthalene, the compound believed to have the formula $(RuCl_2[PPh_2(CH_2)_4PPh_2])_2$, and the dinuclear compound $[Ru_2Cl_3(PEt_2Ph)_6]Cl$.

Ruthenium complexes which function as active hydrogenation catalysts in our process without preliminary reduction or hydride treatment include $RuCl_2(PPh_3)_3$, $RuCl_2(AsEt_2Ph)_3$ and $RuHCl(PPh_3)_3$.

The liquid medium in which the hydrogenation processes of our invention may be carried out may comprise an excess of the unsaturated substrate if it is liquid under the prevailing conditions of temperature and pressure and is a solvent for the catalyst; but the reaction is preferably carried out in the presence of an inert solvent or co-solvent. Examples of suitable solvents include aromatic hydrocarbons (e.g. benzene, or toluene), alcohols (e.g. ethanol), ketones (e.g. acetone), ethers (e.g. diethyl ether or tetrahydrofuran) and saturated hydrocarbons (e.g. n-hexane). In some circumstances chlorinated solvents have an inhibiting effect on the rate of hydrogenation. Furthermore, the use of solvents which act as strong complexing agents for ruthenium, e.g. pyridine or acetonitrile, should be avoided.

The process should be performed under substantially oxygen-free conditions; this can conveniently be accomplished by working under an atmosphere of hydrogen alone or mixed with an inert gas, such as nitrogen. Similar precautions should be observed during reduction or activation of ruthenium catalysts. The solution is preferably stirred or shaken during hydrogenation.

Hydrogenation may take place at ambient or elevated temperatures, provided that the decomposition temperature of the catalyst is not exceeded; but in many applications, hydrogenation may be accomplished at ambient temperature. Ambient pressure is preferred, but elevated pressures may be used if desired.

The catalyst concentration should be between 1 molar and $10^{-5}$ molar, but is preferably between $10^{-1}$ and $10^{-3}$ molar with respect to the total solution. Generally speaking, little advantage is gained by using catalyst concentrations above $10^{-2}$ molar. The catalyst is conveniently added to the reaction mixture in the form of a solution; but catalysts which do not require pre-reduction may be added in solid form.

The invention will now be illustrated by, but is not limited to, the following examples.

EXAMPLE 1

14 mg. of ruthenium complex $RuCl_2(PPh_3)_3$ was placed in a glass vessel which was then purged with hydrogen for 5 minutes. The hydrogen pressure was allowed to fall to ambient pressure and 2 ml. of a mixed substrate, comprising a 0.5 M solution of each of hexene-1 and cyclohexene in 1:1 ethanol/benzene, was added to the flask.

The solution was stirred magnetically to dissolve the catalyst giving a catalyst concentration of $1 \times 10^2 M$. Hydrogenation was allowed to proceed at ambient temperature. The product was analysed at intervals by gas/liquid chromatography. The progress of the hydrogenation may be seen from the results in Table I below:

TABLE I

| Time from start (mins.): | Percent hexene converted to hexane | Percent cyclohexene converted to cyclohexane |
|---|---|---|
| 10 | 1 | <1 |
| 20 | 13 | <1 |
| 30 | 45 | <1 |
| 40 | 67 | <1 |
| 50 | 87 | <1 |
| 60 | 92 | <1 |
| 76 | 96 | <1 |
| 99 | 98 | <1 |
| 160 | 99 | 4 |
| 1,140 | >99 | 37 |

It will be seen that 98% of the hexene had been hydrogenated before a measurable amount of the cyclohexene had been converted to cyclohexane. The hydrogenation was repeated using an isopropanol/benzene mixture, and gave a similar result.

EXAMPLE 2

The procedure of Example 1 was followed using a mixed substrate comprising a 0.5 M solution of each of hexyne-1 and octene-1 in a 1:1 ethanol/benzene mixture. The results of the hydrogenation are given in Table II.

TABLE II

| | Percent hexyne converted to hexene | Percent hexene converted to hexane | Percent octene converted to octane |
|---|---|---|---|
| Time from start (mins.): | | | |
| 30 | 9 | <1 | <1 |
| 126 | 42 | <1 | <1 |
| 160 | 61 | <1 | <1 |
| 219 | 75 | <1 | <1 |
| 232 | 87 | 3 | 2 |
| 264 | >99 | 11 | 6 |
| 282 | >99 | 23 | 20 |
| 292 | >99 | 29 | 24 |
| 1,260 | >99 | 95 | 91 |

It will be seen that some 80% of the hexyne had been converted to hexene before the hexene so produced or the octene already present began to react. The hexene and octene, being unsaturated species of similar type (i.e. terminal olefins) were then hydrogenated at similar rates.

The hydrogenation was repeated using an isopropanol/benzene mixture, and gave a similar result.

EXAMPLE 3

The procedure of Example 1 was repeated, using a substrate comprising a 1.0 M solution of 4-vinyl cyclohexene in a 1:1 butanol/toluene mixture.

The results of the hydrogenation are given in Table III.

TABLE III

| | Percent 4-vinyl cyclohexene converted to— | | |
|---|---|---|---|
| | Ethyl cyclohexene | Vinyl cyclohexane | Ethyl cyclohexane |
| Time from start (mins.): | | | |
| 10 | 23 | <1 | <1 |
| 24 | 46 | <1 | <1 |
| 80 | 48 | 2 | 2 |
| 100 | 49 | 2 | 2 |
| 120 | 50 | 4 | 4 |
| 170 | 53 | 7 | 7 |
| 277 | 61 | 7 | 8 |
| 337 | 65 | 5 | 9 |
| 397 | 69 | 4 | 11 |
| 4,320 | 78 | <1 | 22 |

It will be seen that the 4-vinyl cyclohexene is converted rapidly to ethyl cyclohexene and much more slowly to vinyl cyclohexane and ethyl cyclohexane. The fall in the percent of vinyl cyclohexane after 277 minutes is due to competitive hydrogenation between the ethyl cyclohexene and the vinyl cyclohexane; the result confirms that, with our process terminal olefins are hydrogenated in preference to cyclic olefins.

EXAMPLE 4

The procedure of Example 1 was followed using a mixed substrate comprising a 0.5 M solution of each of hexyne-1 and octene-1 in 1:1 ethanol/benzene, but the hydrogenation was carried out at 50° C.

The results of the hydrogenation are given in Table IV.

TABLE IV

| | Percent hexyne converted to hexene | Percent hexene converted to hexane | Percent octene converted to octane |
|---|---|---|---|
| Time from start (mins.): | | | |
| 60 | 20 | <1 | <1 |
| 120 | 38 | <1 | <1 |
| 180 | 60 | <1 | <1 |
| 220 | 86 | <1 | <1 |
| 230 | 99 | <1 | <1 |

After 230 minutes, with less than 1% hexyne remaining, the hexene and octene began to isomerise. No further hydrogenation was observed.

EXAMPLE 5

234 mg. of the ruthenium complex $Ru_2Cl_4(PPhEt_2)_6$ and 8 ml. tetrahydrofuran were placed in a glass vessel which had been previously flushed with hydrogen. 50 mg. of lithium aluminum hydride ($LiAlH_4$) was then added and the mixture refluxed under an atmosphere of dry hydrogen until the solution was very pale. 2 ml. of ethanol was added to destroy the excess $LiAlH_4$ and the resulting green solution was used as a selective hydrogenation catalyst as follows:

1 ml. of the solution of reduced $Ru_2Cl_4(PPhEt_2)_6$, produced as detailed above, was placed in a glass vessel with 0.5 ml. of 2 M cyclohexene and 0.5 ml. of 2 M hexene-1 in 1:1 ethanol/benzene, under an atmosphere of hydrogen at ambient pressure. The catalyst concentration in the mixture was approximately $1 \times 10^{-2}$ M. The solution was stirred magnetically and the course of the hydrogenation monitored by G.L.C. The results are given in Table V.

TABLE V

| | Percent hexene converted to hexane | Percent cyclohexene converted to cyclohexane |
|---|---|---|
| Time from start (mins.): | | |
| 3 | 23.9 | Nil |
| 9 | 67.3 | Trace |
| 25 | 96.8 | 2.4 |
| 47 | 98.3 | 3.3 |
| 67 | 99 | 4.3 |
| 128 | 99 | 6.2 |
| 151 | 99 | 7.3 |

The complex $Ru_2Cl_4(PPhEt_2)_6$ was inactive as a hydrogenation catalyst before treatment with $LiAlH_4$.

EXAMPLE 6

The procedure of Example 5 was followed using the same catalyst but a substrate comprising a mixture of hexyne-1 and octene-1 in 1:1 ethanol/benzene.

The results of the hydrogenation are given in Table VI.

TABLE VI

| | Percent hexyne converted to hexene | Percent hexene converted to hexane | Percent octene converted to octane |
|---|---|---|---|
| Time from start (mins.): | | | |
| 1 | 56.0 | Nil | Nil |
| 2 | 92.9 | Trace | Trace |
| 4 | 98.1 | 1.9 | 1.5 |
| 10 | >99 | 15.5 | 15.4 |
| 15 | >99 | 28.0 | 28.0 |
| 21 | >99 | 43.5 | 43.4 |
| 32 | >99 | 67.5 | 66.4 |

It will be seen that more than 90% of the hexyne-1 was converted to hexene-1 before the octene-1 began to react. The mixture then contained substantially only hexene and octene, and those were hydrogenated at similar rates since they are both terminal olefins.

EXAMPLE 7

The procedure of Example 1 was repeated using $RuCl_3(Et_2S)_3$ as catalyst; no hydrogenation was observed. After treatment with $LiAlH_4$ as described in Example 5 the product was found to be an active hydrogenation catalyst which exhibited selectivity when applied to suitable mixed substrates.

EXAMPLE 8

The procedure of Example 1 was followed using a 0.5 M solution of an olefin mixture (66.5% trans 1:3 pentadiene, 22.5% cis 1:3 pentadiene and 11.0% cyclopentadiene) in 1:1 ethanol/benzene.

The results of the hydrogenation are given in Table VII.

TABLE VII

| Time from start (mins.) | Percent trans 1:3 pentadiene converted to pentenes 1 and 2 | Percent cis 1:3 pentadiene converted to pentenes 1 and 2 | Percent pentene-1 converted to pentane | Percent pentene-2 converted to pentane | Percent cyclopentene converted to cyclopentane |
|---|---|---|---|---|---|
| 4 | <1 | <1 | <1 | <1 | <1 |
| 23 | 14.8 | 13.4 | <1 | <1 | <1 |
| 31 | 24.8 | 26.3 | <1 | <1 | <1 |
| 53 | 49.3 | 52.4 | <1 | <1 | <1 |
| 61 | 67.5 | 65.2 | <1 | <1 | <1 |
| 85 | >99 | >99 | 18.3 | <1 | <1 |
| 95 | >99 | >99 | 56.4 | <1 | <1 |
| 120 | >99 | >99 | 88.1 | <1 | <1 |

It is seen that the reduction of the dienes was substantially complete before the pentene-1 began to hydrogenate, the pentene-2 and cyclopentene remained unreacted up to 120 minutes.

EXAMPLE 9

18 mg. of $RuHCl(PPh_3)_3$ was used as catalyst in the procedure of Example 1, with the exception that benzene alone was used as solvent. It will be seen from Table VIII below that when 96% of the hexene-1 had been reduced, there was still no measurable reduction of the cyclohexene. This example illustrates the use of a hydrido ruthenium complex selectively without a hydroxylic solvating agent. This supports the proposition that the solvating agent promotes the formation of a hydride species under the conditions of the reaction.

TABLE VIII

| Time from start (mins.): | Percent hexene converted to hexane | Percent cyclohexene converted to cyclohexane |
|---|---|---|
| 5 | 5 | <1 |
| 16 | 35 | <1 |
| 25 | 55 | <1 |
| 37 | 72 | <1 |
| 56 | 83 | <1 |
| 73 | 89 | <1 |
| 90 | 93 | <1 |
| 110 | 96 | <1 |

EXAMPLE 10

The procedure of Example 1 was repeated using (a) ocetene-1 alone and (b) hexyne-1 separately as the reducible substrate in concentrations of 0.5 molar. The progress of the hydrogenations, which were conducted at 50° C., are shown in Table IX.

TABLE IX

| Time from start (mins.) | (a) percent octene-1 converted to octane | Time from start (mins.) | (b) percent hexyne-1 converted to hexane-1 |
|---|---|---|---|
| 2 | 17 | 10 | 11 |
| 8 | 35 | 16 | 14 |
| 17 | 50 | 26 | 17 |
| 27 | 58 | 34 | 19 |
|  |  | 46 | 22 |
|  |  | 56 | 25 |
|  |  | 68 | 30 |

The procedure was repeated using a mixed substrate which was 0.5 molar with respect to octene-1 and 0.5 molar with respect to hexyne-1. The progress of the hydrogenation is shown in Table X.

TABLE X

| | Percent hexyne-1 converted to hexene-1 | Percent octene-1 converted to octane |
|---|---|---|
| Time from start (mins.): | | |
| 14 | 4 | <1 |
| 29 | 9 | <1 |
| 37 | 11 | <1 |
| 60 | 19 | <1 |
| 83 | 28 | <1 |
| 98 | 32 | <1 |
| 111 | 35 | <1 |
| 158 | 52 | <1 |
| 197 | 68 | <1 |
| 229 | 98 | <1 |

It will be noted that when octene-1 and hexyne-1 were present singly the octene-1 reduced much more quickly than the hexyne-1. However when present together it is seen that the hexyne-1 was reduced first, the hexene-1 so produced and the octene-1 being virtually unreduced while any appreciable amount of hexyne-1 remained.

What we claim is:

1. A process for the selective homogeneous hydrogenation of a hydrocarbon substrate containing two or more aliphatic sites of unsaturation which comprises contacting the substrate with hydrogen in the presence of a solution of a polar solvent containing a hydroxyl group and a catalyst soluble therein, said catalyst being a divalent ruthenium compound in which the ruthenium compound is a complex containing in the molecule at least one neutral ligand containing a Group V–B or VI–B donor atom, and at least one anionic ligand, and arresting the reaction when the substrate has reached the required degree of hydrogenation.

2. A process according to claim 1 in which the soluble divalent ruthenium compound contains displaceable ligands.

3. A process according to claim 1 in which a polar solvent containing a hydroxyl group is added to the reaction mixture as a solvating agent.

4. A process according to claim 3 in which the solvating agent is a mono- or polyhydric, aliphatic, cycloaliphatic or aromatic alcohol, a phenol or water.

5. A process according to claim 1 which is carried out in the presence of an inert solvent or co-solvent.

6. A process according to claim 1 in which the neutral ligand is an organic substituted phosphine or arsine.

7. A process according to claim 1 in which the anionic ligand is a halogen.

8. A process according to claim 1 in which the ruthenium compound is $RuCl_2(PPh_3)_3$, $RuHCl(PPh_3)_3$, or $RuCl_2(AsEt_2Ph)_3$.

9. A process according to claim 1 in which the ruthenium compound catalyst comprises the product of reacting a ruthenium compound having a valency of two or more with a simple hydride of a metal of Group I–A or II–A or an element of Group III–B of the Periodic Table or a complex hydride containing more than one such metal or element.

10. A process according to claim 1 in which the concentration of ruthenium compound is from $10^{-1}$ to $10^{-3}$ molar.

11. A process according to claim 1 in which a substrate containing both an acetylenic and an olefinic bond is contacted with hydrogen and the reaction arrested at a stage at which the acetylenic bond has been hydrogenated in preference to the olefinic bond.

12. A process according to claim 1 in which a substrate comprising a conjugated diene and a mono-olefin is contacted with hydrogen and the reaction arrested at a stage at which one of the olefinic bonds of the diene has been hydrogenated in preference to the mono-olefin.

References Cited

UNITED STATES PATENTS

| | | | |
|---|---|---|---|
| 2,360,555 | 10/1944 | Evans et al. | 260—666 |
| 3,076,858 | 2/1963 | Frevel et al. | 260—677 |
| 3,102,899 | 9/1963 | Cannell | 252—431 |
| 3,110,747 | 11/1963 | Mullineaux | 252—437 |
| 3,113,986 | 12/1963 | Breslow et al. | 260—677 |
| 3,391,206 | 7/1968 | Hartog | 260—666 |

HERBERT LEVINE, Primary Examiner

U.S. Cl. X.R.

252—431, 437